(12) United States Patent
Hooda et al.

(10) Patent No.: US 9,219,687 B2
(45) Date of Patent: Dec. 22, 2015

(54) PATH OPTIMIZATION IN MULTI-NODE VIRTUAL SWITCH WITH ORPHAN PORTS

(71) Applicant: Cisco Technology, Inc., San Jose, CA (US)

(72) Inventors: Sanjay Kumar Hooda, Cupertino, CA (US); Rajagopalan Janakiraman, Cupertino, CA (US); Vinay Parameswarannair, Milpitas, CA (US); Vijay Sampath, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 302 days.

(21) Appl. No.: 13/839,159

(22) Filed: Mar. 15, 2013

(65) Prior Publication Data

US 2014/0269329 A1  Sep. 18, 2014

(51) Int. Cl.
*H04L 12/801* (2013.01)
*H04L 12/931* (2013.01)
*H04L 12/721* (2013.01)

(52) U.S. Cl.
CPC ............... *H04L 47/12* (2013.01); *H04L 49/70* (2013.01); *H04L 45/66* (2013.01)

(58) Field of Classification Search
None
See application file for complete search history.

(56) References Cited

U.S. PATENT DOCUMENTS

| 2005/0198371 | A1* | 9/2005 | Smith et al. | 709/238 |
| 2009/0219836 | A1 | 9/2009 | Khan et al. | |
| 2010/0290472 | A1* | 11/2010 | Raman et al. | 370/395.2 |
| 2011/0274114 | A1* | 11/2011 | Dhar et al. | 370/401 |
| 2014/0269329 | A1* | 9/2014 | Hooda et al. | 370/238 |

FOREIGN PATENT DOCUMENTS

EP  2391073 A1  11/2011

OTHER PUBLICATIONS

International Search Report for PCT/US2014/022085, Jul. 10, 2014.

* cited by examiner

*Primary Examiner* — Benjamin H Elliott, IV
(74) *Attorney, Agent, or Firm* — Patterson + Sheridan, LLP

(57) ABSTRACT

Embodiments provide techniques for optimizing paths in a network environment with a virtual network device that includes a first physical network device and a second physical network device, connected using a virtual network device layer link. Embodiments receive a first data packet belonging to a first data flow, at the first physical network device, from the second physical network device, over the virtual network device layer link. An adjacent network device from which the second physical network device received the first data packet is determined. Embodiments also determine one or more links connecting the first physical network device and the adjacent network device. A network message is transmitted to the adjacent network device, where the adjacent network device is configured to transmit subsequent data packets from the first data flow to the virtual network device, using only the determined one or more links, responsive to receiving the network message.

17 Claims, 6 Drawing Sheets

PATH OPTIMIZATION IN MULTI-NODE VIRTUAL SWITCH WITH ORPHAN PORTS

TECHNICAL FIELD

Embodiments presented in this disclosure generally relate to virtualization, and more specifically to techniques for configuring optimizing paths for a virtual network device made up of two or more physical network devices.

BACKGROUND

Data communication in a computer network involves the exchange of data between two or more entities interconnected by communication links and sub-networks. A local area network (LAN) is an example of a sub-network that provides relatively short-distance communication among the interconnected stations. In contrast, a wide area network (WAN) facilitates long-distance communication over links provided by public or private telecommunications facilities. The entities are typically software programs executing on hardware computer platforms which, depending on their roles within the network, may serve as end stations or intermediate stations. Examples of intermediate stations include routers, bridges and switches that interconnect communication links and sub-networks, whereas an end station may be a computer located on one of the sub-networks. More generally, an end station connotes a source of or target for data that typically does not provide routing or other services to other computers on the network.

End stations typically communicate by exchanging discrete packets or frames of data according to predefined protocols. In this context, a protocol represents a set of rules defining how the stations interact with each other to transfer data. The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1. As another example, layer 3 traffic is known as network layer traffic and uses logical addressing (e.g., Internet Protocol (IP) addresses) for routing traffic. Layer 3 encapsulation generally provides the mechanism for transmitting data between a source host on a first network to a destination host located on a second network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
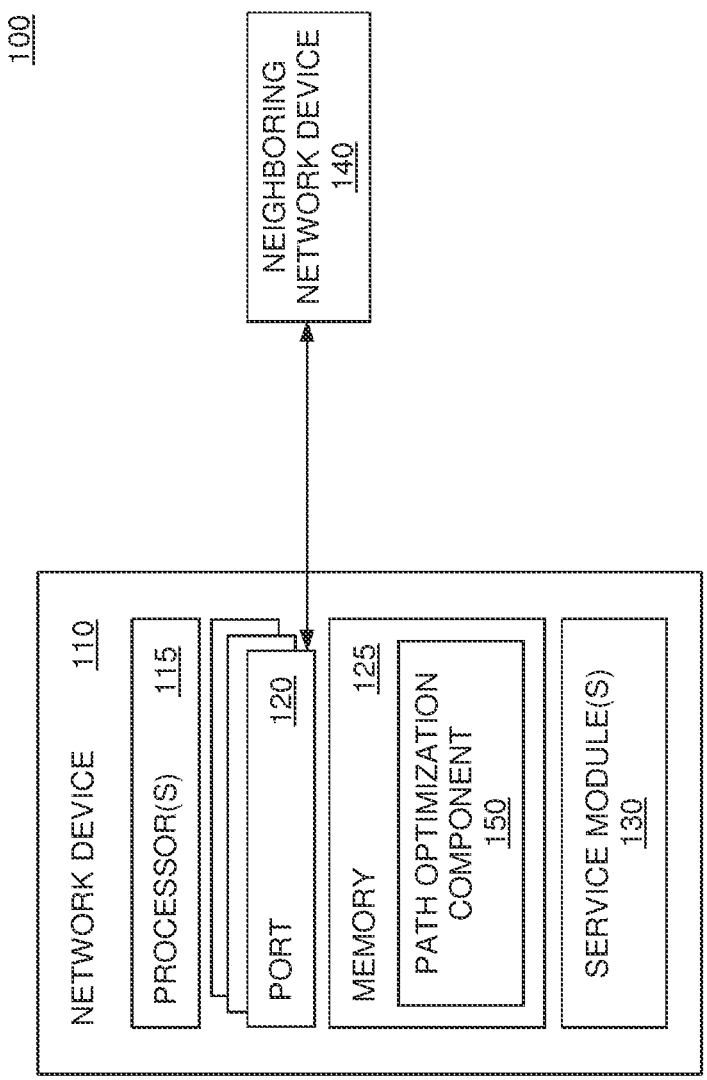
FIG. 1 illustrates a network device configured with a path optimization component, according to one embodiment described herein.

Embodiments provide a method, network device and computer program product for optimizing paths in a network environment containing a virtual network device. The virtual network device includes a first physical network device and a second physical network device, connected using a virtual network device layer link. The method, network device and computer program product include receiving a first data packet belonging to a first data flow, at the first physical network device, from the second physical network device, over the virtual network device layer link. The method, network device and computer program product also include determining an adjacent network device from which the second physical network device received the first data packet. Additionally, the method, network device and computer program product include determining one or more links connecting the first physical network device and the adjacent network device. The method, network device and computer program product further include transmitting a network message to the adjacent network device, wherein the adjacent network device is configured to transmit subsequent data packets from the first data flow to the virtual network device, using only the determined one or more links, responsive to receiving the network message.

Example Embodiments

Generally speaking, a network device (e.g., a network switch) is a computer device that connects network segments. A network device may operate at one or more layers including, for example, the physical layer, the data link layer, the network layer, and/or the transport layer. While four layers are described, it is to be appreciated that in different examples a switch may operate at all seven layers of the Open Systems Interconnection (OSI) stack. For instance, a network device may inspect data packets as they are received. In doing so, the network device may determine the source and destination of a packet and may forward it accordingly. Additionally, a network device may contain some intelligence beyond examine and forward logic. This intelligence facilitates having a network device perform some management functions. For example, a network device could selectively turn some port range on or off, may selectively establish and/or maintain priority settings for ports, may perform media access control (MAC) filtering to prevent MAC flooding, may use a spanning tree protocol, may perform link aggregation, and so on. Typically, when these management functions are performed, they are performed in actual (e.g., physical) network devices.

Generally, network devices are interconnected by communication links for transmitting data packets through physical ports. In order to provide increased network reliability, redundant switches (and links) are often included in a network. In the event that a switch (or link) fails, a redundant switch (or link) already in place within the network can quickly be enabled to replace the failed switch (or link). Since the redundant switch or link can typically be enabled as a replacement more quickly than the failed component can be replaced or repaired, having redundant links and/or switching provides a more reliable network.

Additionally, in order to provide redundancy or bandwidth, some networks bundle multiple physical links to operate as a single virtual link or logical channel. Such a group of physical links in the virtual link is referred to herein as a port-channel, a link aggregation bundle, and a link bundle. A number of protocols may be used to bundle two or more physical links or ports together to form a single logical channel. Examples of these protocols include Port Aggregation Protocol (PAgP) and IEEE 802.1AX Link Aggregation Control Protocol (LACP). These protocols are referred to generally herein as link aggregation protocols and it is to be understood that other protocols may be used without departing from the scope of the embodiments.

To further improve network reliability, two or more network devices may be grouped (or bundled) together into a single logical network device. In such an embodiment, the grouped network devices generally function as a single virtual network device. Moreover, such a virtual network device (e.g., a virtual switch) may appear to the network devices in the network to be a single network device. Examples of protocols for bundling network devices include, without limitation, virtual port channel (vPC) and virtual switching system (VSS). Additionally, the network devices within the virtual network device communicate via one or more links (referred to herein as inter-switch links).

For example, in a network system configured according to the VSS protocol, two or more chassis-type layer 3 switches (hereinafter referred to as a physical switch) can be operated as one virtual switch (hereinafter a virtual switch). In such an example, a control plane (e.g., for performing the apparatus control and the protocol process) of two physical switches may be divided into active and standby, and a data plane (e.g., for performing the packet forwarding) for either could be used in the active state.

Additionally, virtual switches may provide various services such as, without limitation, firewall services, load balancing services and quality of service (QoS) functionality. Generally, these services may be provided on the virtual switch by service modules, which can be broadly subdivided into internalized service modules and external service modules. The service modules may be communicatively coupled to the virtual switch via one or more ports. As defined herein, the ports which connect the virtual switch and the service modules are referred to as "service ports." More generally, the "service ports" refer to any connection mechanism that can be used for communications between the service modules and the virtual switch. For instance, one example of a service port could be an external Ethernet port for use in communicating with an external service module, while another service port could be an internal connection (e.g., as part of the backplane, such as a PCIe connection) for use in connecting with an internal service module. Of course, such examples are provided without limitation and for illustrative purposes only, and one of ordinary skill in the art will quickly recognize that the "service ports" can refer to numerous other types of connections, both known and unknown, that can be used consistent with the present disclosure.

Internalized service modules could be implemented using hardware and firmware within the physical switch on which the virtual switch is running. As an example, one internalized service module could be implemented as logic running on an application-specific integrated circuit (ASIC) within the physical switch (e.g., service cards for network switches). The ASIC (or the card on which the ASIC resides) may be connected to the virtual switch via one or more service ports. Such internalized service modules may be preferable, for instance, for virtual switches with enhanced security requirements and which require a dedicated internal service module (e.g., to comply with particular government regulations).

On the other hand, an external service module may be provided by an external apparatus. For instance, such an external service module may be implemented using hardware, firmware, software, or some combination of the three, and may be communicatively coupled to the virtual switch via one or more service ports. Such an external service module may be preferable, for instance, as the capabilities of the external service module may be more easily expandable and for lower cost.

Although there are numerous advantages of network device teaming (e.g., a virtual switch created according to the vPC protocol), there are challenges as well. For instance, certain service modules (e.g., a firewall service module) may be configured to operate on data flows, such that all of the data packets belonging to a particular data flow (e.g., a TCP flow) should be processed using a single service module. However, in a virtual switch consisting of multiple physical switches joined together to form a single logical switch, the data packets may be transmitted by neighboring switches to any of the multiple physical switches. As such, when such a service module is used to process a particular data flow on a particular one of the physical switches, the data packets within the particular data flow that are transmitted to other physical switches may be forwarded to the particular physical switch having the service module. While the physical switches may be interconnected using a virtual switch layer link that could be used to forward such data packets, it is generally preferable to avoid transmitting data plane traffic (e.g., such as the data packet being forwarded in this example) on the virtual switch layer link. That is, the forwarding of such data plane traffic may cause congestion on the virtual switch layer link, which is delay or impede the transmission of control plane traffic across the virtual switch layer ink. Additionally, as the processing capacity of service modules continues to increase, the amount of forwarded data plane traffic may outpace the bandwidth of the virtual switch layer link.

As such, embodiments provide techniques for optimizing paths in a network environment with a virtual network device that includes a first physical network device and a second physical network device, connected using a virtual network device layer link. Embodiments receive a first data packet belonging to a first data flow, at the first physical network device, from the second physical network device, over the virtual network device layer link. Here, logic on the second physical network device could have forwarded the first data packet to the first physical network device, responsive to a determination that the first data packet belongs to a data flow currently being processed by a service module on the first physical network device.

Embodiments may also determine an adjacent network device from which the second physical network device received the first data packet. For instance, embodiments could identify a port of the second physical network device on which the data packet was originally received on the second physical network device, and could access a neighbor information database to determine information about the identified port and the adjacent network device that the port connects to. Embodiments may also determine one or more links connecting the first physical network device and the adjacent network device. For instance, upon determining information about the adjacent network device from which the second physical network device received the data packet, embodiments could determine one or more ports of the first physical network device that connect to the adjacent network device. Embodiments could then transmit a network message to the adjacent network device (e.g., using one or more of the determined ports of the first physical network device).

Upon receiving the message, logic on the adjacent network device could be configured to transmit subsequent data packets from the first data flow to the virtual network device, using only the determined one or more links. For example, in one embodiment, logic on the adjacent network device could update a hash function used for load balancing data packets in the first data flow, so that the hash function only produces hash values corresponding to links between the first physical network device and the adjacent network device, for data packets in the first data flow. Advantageously, doing so helps to optimize paths within the virtual switch, by minimizing the amount of data plane traffic flowing across the virtual switch layer link between the physical network devices in the virtual switch.

FIG. 1 illustrates a network device configured with a path optimization component, according to one embodiment described herein. As shown, the network environment 100 includes a network device 110 and a neighboring network device 140. The network device 110 includes one or more processors 115, communication ports 120, a memory 125 and one or more service modules. The processor 115 may be any processing element capable of performing the functions described herein. The processor 115 represents a single processor, multiple processors, a processor with multiple cores, and combinations thereof. The memory 125 may be either volatile or non-volatile memory and include, RAM, flash, cache, disk drives and the like. Additionally, the memory 125 contains a path optimization component 150. As discussed above, the path optimization component 150 is generally configured to detect when a data packet is forwarded across a virtual switch layer link (e.g., by a second network device, not shown). Upon receiving such a data packet, the path optimization component 150 could configure an adjacent network device (e.g., the neighboring network device 140) to forward subsequent packets from the data flow, only across a subset of links (e.g., across one or more links connecting the adjacent network device 140 and the network device 110). Moreover, the memory 125 could also contain network logic—e.g., a content addressable memory—for forwarding data in a communication network. The device 110 may also include a control plane for configuring and managing the forwarding logic.

Figure 2:
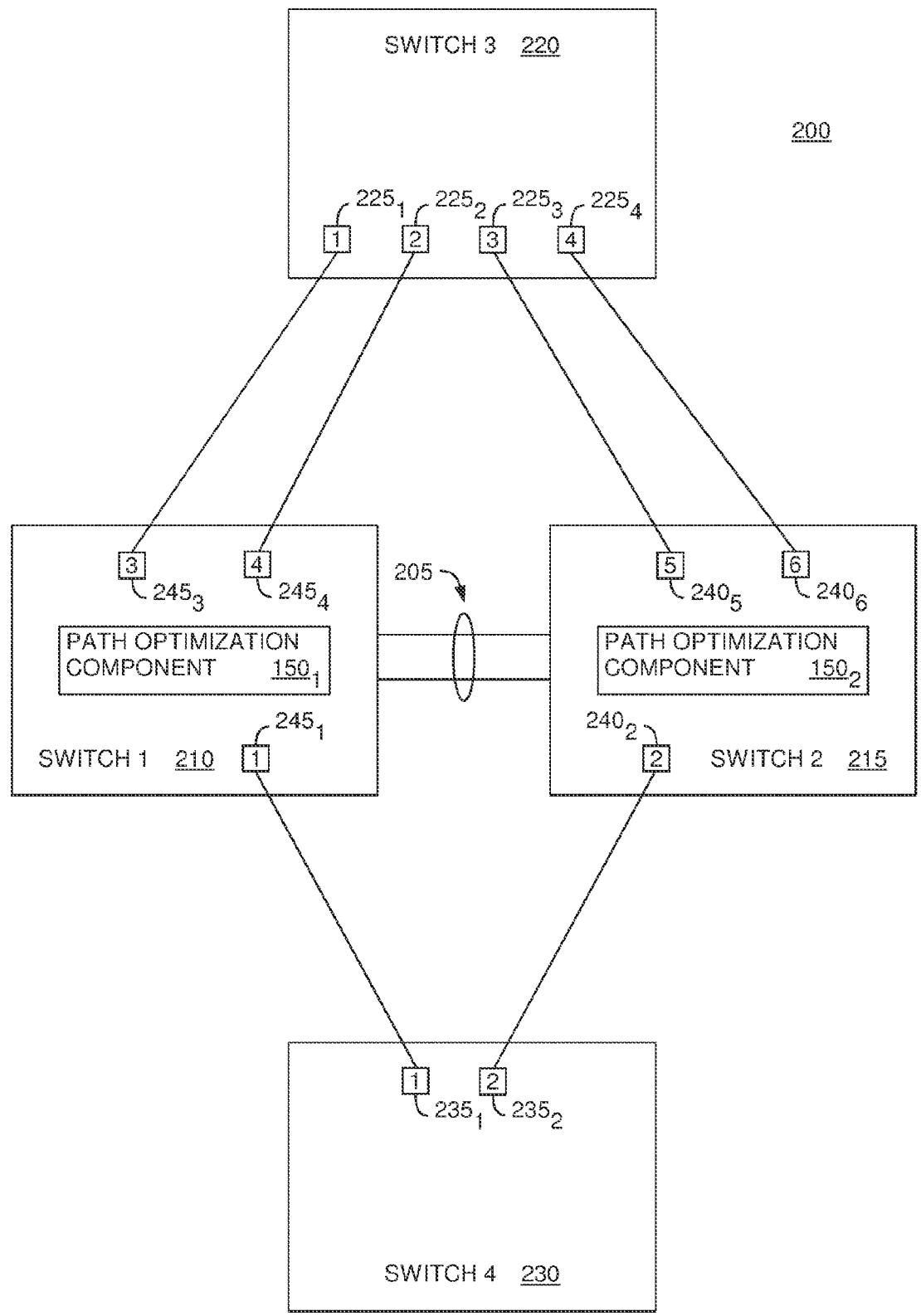
FIG. 2 illustrates a network environment configured with path optimization components, according to one embodiment described herein.

FIG. 2 illustrates a network environment configured with path optimization components, according to one embodiment described herein. As shown, the network environment 200 includes switches 210, 215, 220 and 230. The switch 210 includes ports $245_{3-4}$ that connect to the switch 220 at ports $225_{1-2}$, and also includes the port $245_1$ that connects to the switch 230 at port $235_1$. Likewise, the switch 215 includes ports $240_{5-6}$ that connect to the switch 220 at ports $225_{3-4}$, and also includes port $240_2$ that connects to the switch 230 at port $235_2$. Here, the switches 210 and 215 are each configured with a respective path optimization component $150_{1-2}$.

For purposes of this example, assume that the switches 210 and 215 are paired to form a single virtual switch, and that the switches 220 and 230 are configured to view and treat the switches 210 and 215 as a single logical entity. That is, if the switch 230 receives a data packet to forward to the virtual switch, the switch 230 could employ a load balancing algorithm to select one of the ports $235_{1-2}$ and could transmit the data packet using the selected port. Thus, even though the data packet is transmitted to a different physical switch (i.e., either switch 210 or 215) depending on which port $235_{1-2}$ is selected, the switches 210 and 215 are configured to function as a single virtual switch, the data packet is still transmitted to the single virtual switch regardless of which port is selected.

Additionally, the switches 210 and 215 are interconnected by a virtual switch layer link 205. In the depicted example, the virtual switch layer link 205 includes multiple links, joined together into a single logical link (e.g., a port-channel). Generally, the virtual switch layer link 205 may be used for transmitting control plane traffic between the switches 210 and 215. As discussed above, the virtual switch layer link 205 may also be used to forward data plane traffic between the switches 210 and 215, although it is generally considered undesirable due to limited bandwidth availability and latency concerns.

As discussed above, when forwarding a data packet at the switch 230 to the virtual switch, logic on the switch 230 may select one of the ports $235_{1-2}$ (e.g., using a hash-based load balancing algorithm) that connect to the virtual switch, and could transmit the data packet across the selected port. For purposes of this example, assume that the logic on the switch 230 selects the port $235_1$ and transmits the data packet to the switch 210. At this point, one or more service modules on the switch 210 could begin performing one or more operations (e.g., a firewall service) for the data packet and its corresponding data flow. Assuming that the data packet is next destined for the switch 220, logic on the switch 210 could employ a load balancing algorithm to select one of the ports $245_{3-4}$ and could transmit the data packet on the selected port. The switch 220 could then forward the data packet on towards its destination (not shown).

Figure 3A:
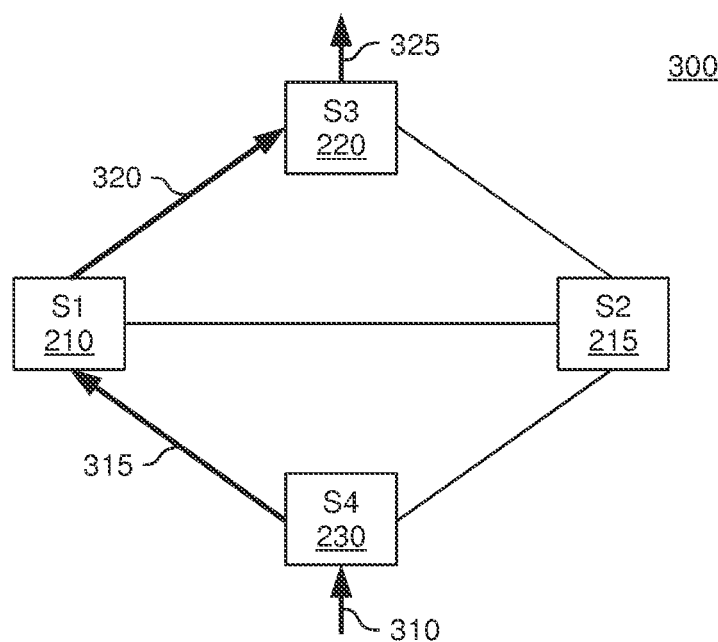
FIGS. 3A-C illustrate exemplary paths through the network environment shown in FIG. 2, according to embodiments described herein.
Figure 3B:
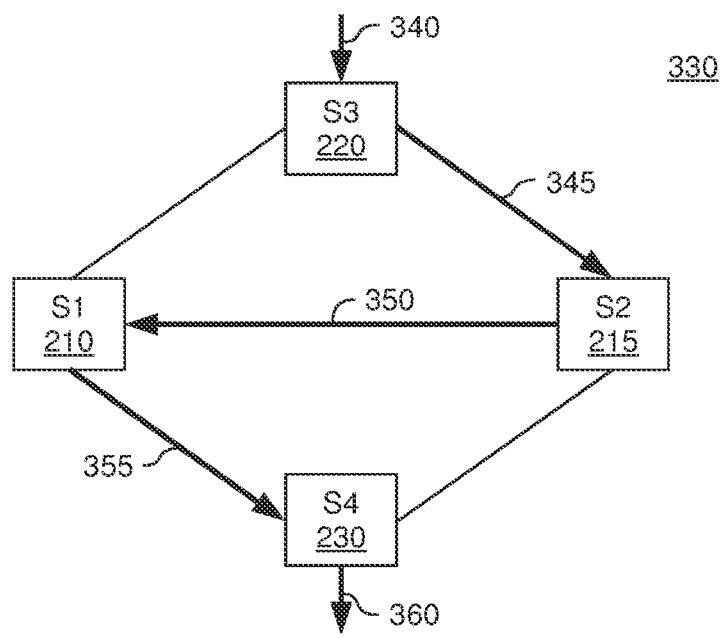
Figure 3C:
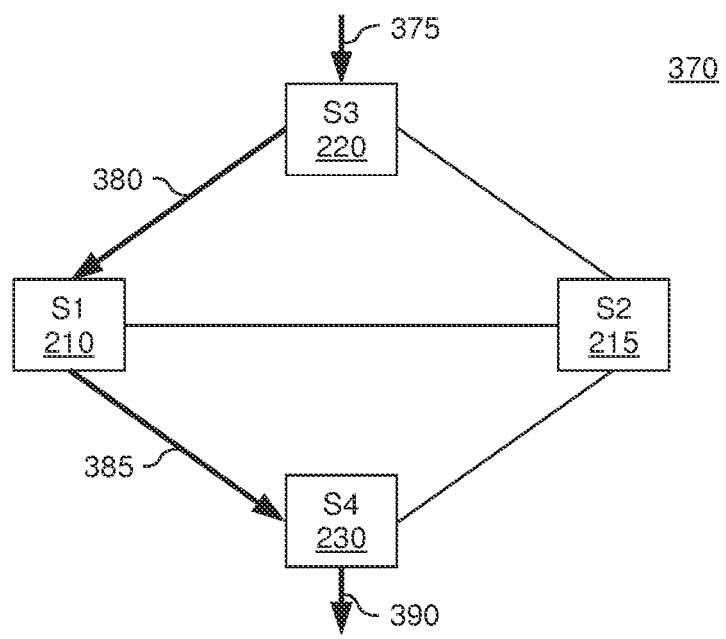

FIGS. 3A-C illustrate exemplary paths through the network environment shown in FIG. 2, according to embodiments described herein. A visual depiction of the aforementioned path is shown in FIG. 3A. Here, the diagram 300 shows the data packet arriving at the switch 230 (path 310), being transmitted to the switch 210 (path 315), being transmitted to the switch 220 (path 320), and then being forwarded on towards its destination (path 325).

Once the data packet reaches its destination, a response data flow may be transmitted back to the source of the data packet. Since the switch 220 views the switches 210 and 215 as a single logical entity (i.e., the virtual switch), the switch 220 may not necessarily forward the data packets in the response data flow to the switch 210, and these data packets may be forwarded to the switch 215 instead. That is, the switch 220 may be configured to bundle all of the links connecting the switch 220 with the switches 210 and 215, and to employ a load balancing algorithm to select one of the links within the bundle for forwarding the data packets. However, since the service module(s) on the switch 210 are currently processing the data flow, the data packets (i.e., data plane traffic) forwarded to the switch 215 may be transmitted across the virtual switch layer link connecting the switches 210 and 215.

An example of this is shown in FIG. 3B. Here, the diagram 330 illustrates a data packet in the response data flow arriving at the switch 220 (path 340), being transmitted to the switch 215 (path 345), being forwarded across the virtual switch layer link to the switch 210 (path 350), and being transmitted to the switch 230 (path 355). The switch 230 then forwards the data packet on towards its destination (path 360). However, as discussed above, the virtual switch layer link is generally intended for control plane traffic between the switches 210 and 215 within the virtual switch, and it is generally considered undesirable to forward such data plane traffic across the virtual switch layer link.

As such, the path optimization component $150_1$ on the switch 210 could detect when a data packet, belonging to a particular data flow, is received at the switch 210 from the switch 215 over the virtual network device layer link 205. The path optimization component $150_1$ could then identify an adjacent network device from which the switch 215 received the data packet. For example, the path optimization component $150_1$ could identify a port of the switch 215 on which the switch 215 received the data packet, and could identify an adjacent network device corresponding to the identified port (e.g., by querying a neighbor information database of the switch 215). Thus, in the depicted example, the path optimization component $150_1$ could determine that the switch 215 received the data packet from the switch 220.

The path optimization component $150_1$ could then determine one or more ports of the switch 210 that connect to the adjacent network device (i.e., the switch 220). Thus, in this example, the path optimization component $150_1$ could determine that the ports $245_{3-4}$ connect to the switch 220. The path optimization component $150_1$ could then transmit a network message to the switch 220, instructing the switch 220 to transmit subsequent data packets from the particular data flow to the virtual network device, using only links between the switch 210 and the switch 220. Here, the path optimization component $150_1$ could instruct the switch 220 to transmit the subsequent data packets using only the ports $225_{1-2}$ of the switch 220. Advantageously, doing so helps to minimize the amount of data plane traffic flowing across the virtual switch layer link 205.

A visual depiction of the optimized path for the subsequent data packets in the particular data flow is shown in FIG. 3C. Here, the diagram 370 illustrates the data packets arriving at the switch 220 (path 375) and being forwarded to the switch 210 (path 380). For example, logic on the switch 220 could employ a load balancing to select one of only the ports $225_{1-2}$, rather than selecting one of the ports in the entire link bundle (i.e., ports $225_{1-4}$). The switch 210 then forwards the data packets to the switch 230 (path 385), which forwards the data packets on towards their destination (path 390). Thus, in the exemplary path shown in the diagram 370, no data plane traffic is transmitted across the virtual switch layer link 205 between the switches 210 and 215.

In one embodiment, the adjacent network switch 220 is configured to update a hash function used to load balance the subsequent data packets in the particular data flow, responsive to receiving the instruction. For instance, assume that the switch 220 uses a hash function to select one of the ports $225_{1-4}$ to use in forwarding data packets to the virtual switch, where each of the ports $225_{1-4}$ corresponds to a respective hash value produced by the hash function. In such an example, upon receiving an instruction to restrict subsequent data packets from the particular flow to only the links between the switch 220 and the switch 210, logic on the adjacent network switch 220 could reconfigure the hash function to only produce hash values corresponding to the ports $225_{1-2}$. Advantageously, doing so ensures that the subsequent packets from the particular data flow will be forwarded to the switch 210, instead of the switch 215, and also preserves load balancing functionality with respect to the ports $225_{1-2}$.

Figure 4:
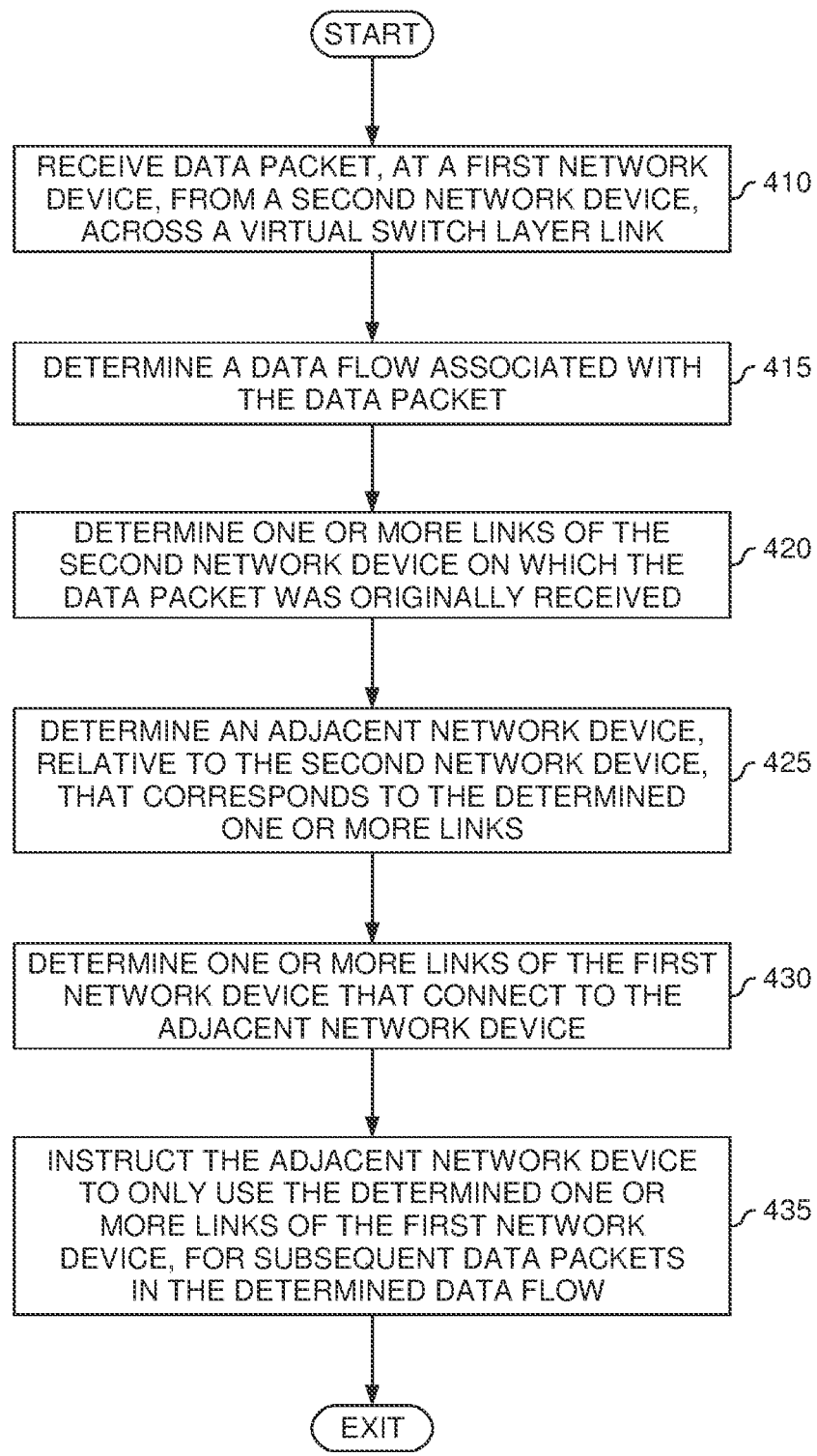
FIG. 4 is a flow diagram illustrating a method of configuring an adjacent network device to optimize paths through a virtual network device, according to one embodiment described herein.

FIG. 4 is a flow diagram illustrating a method of configuring an adjacent network device to optimize paths through a virtual network device, according to one embodiment described herein. As shown, the method 400 begins at block 410, where the path optimization component 150 at a first network device receives a data packet, from a second network device and across a virtual switch layer link between the first and second network devices. For example, in the network environment 200 shown in FIG. 2, the path optimization component $150_1$ could receive a data packet from the switch 215 over the virtual switch layer link 205. Thus, in this example, the switch 220 has transmitted the data packet to the virtual switch made up of the switches 210 and 215, by load balancing Upon receiving the data packet, the path optimization component 150 determines a data flow associated with the data packet (block 415). For example, the path optimization component 150 could inspect header information with the data packet and could determine a flow identifier that uniquely identifies a data flow to which the data packet corresponds (e.g., a TCP flow). The path optimization component 150 also determines one or more links of the second network device on which the second network device originally received the data packet (block 420). Additionally, the path optimization component 150 determines an adjacent network device, relative to the second network device, that corresponds to the determined one or more links (block 425). For instance, the path optimization component 150 could maintain (or retrieve) neighbor information describing neighboring network devices of the second network device, and could use this neighbor information to identify the adjacent network device from which the second network device received the data packet.

Once the adjacent network device is identified, the path optimization component 150 determines one or more links that connect the first network device with the adjacent network device (block 430). For example, in the network environment 200, the path optimization component 150 could determine that the switch 215 received the data packet from the adjacent network device over the port $240_5$, and could further determine that the ports $245_{3-4}$ on the switch 210 connect to the adjacent network device as well. The path optimization component 150 could then instruct the adjacent network device to only use the determined one or more links between the first network device and the adjacent network device, for subsequent data packets in the determined data flow (block 435), and the method 400 ends.

Figure 5:
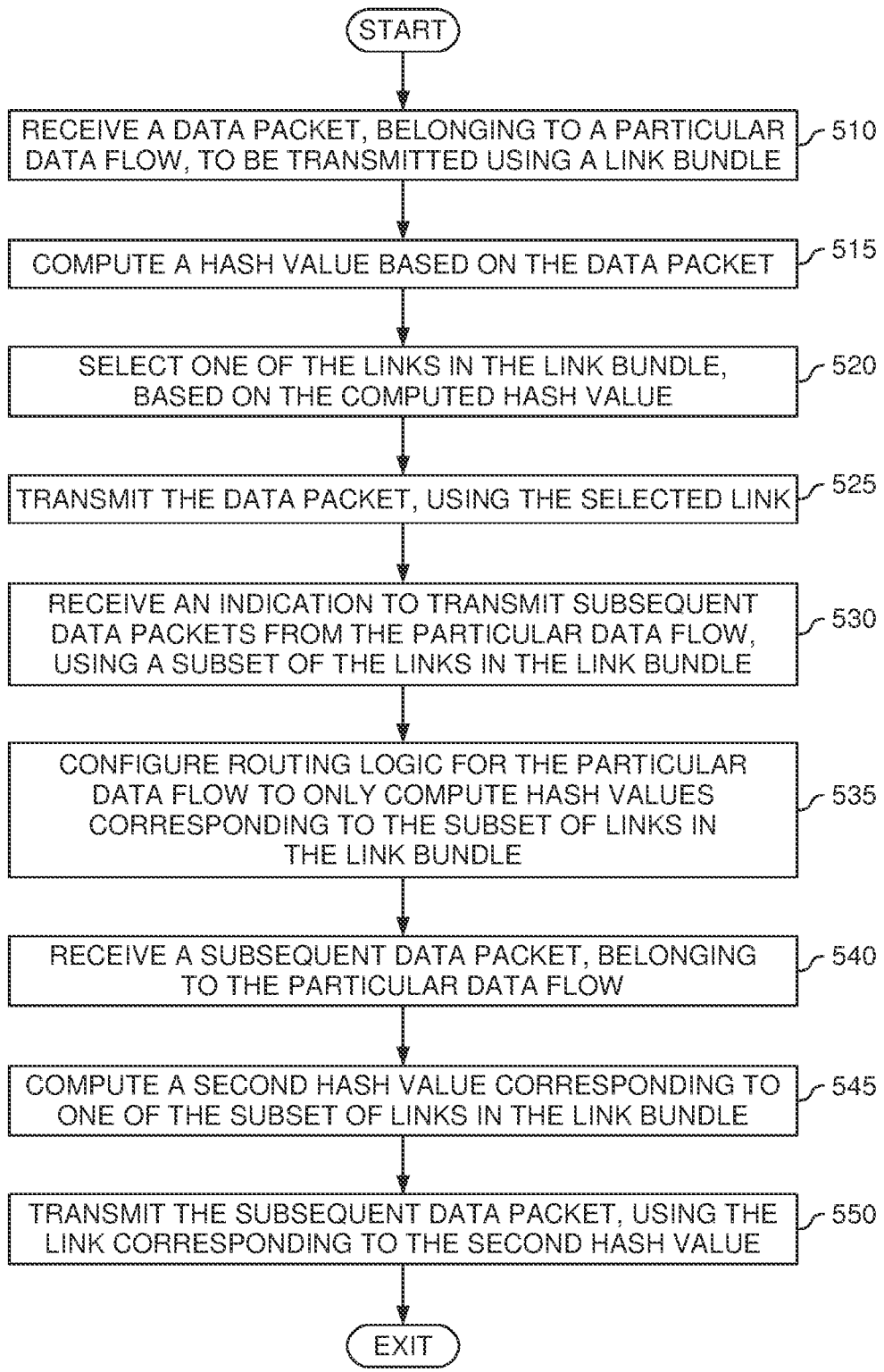
FIG. 5 is a flow diagram illustrating a method of configuring an adjacent network device to optimize paths through a virtual network device, according to one embodiment described herein.

As discussed above, one technique for configuring the adjacent network device to only use a subset of links within a link bundle, for subsequent data packets in the data flow, is by reconfiguring the load balancing hash function for data packets on the adjacent network device. For instance, the adjacent network device could be configured with a path optimization component 150 that, in certain circumstances, modifies the hash function of the adjacent network device. An example of such an embodiment is shown in FIG. 5, which is a flow diagram illustrating a method of configuring an adjacent network device to optimize paths through a virtual network device, according to one embodiment described herein. As shown, the method 500 begins at block 510, where the adjacent network device receives a data packet, belonging to a particular data flow, to be transmitted using a link bundle. Generally, the link bundle may be created using any resource teaming protocol, consistent with the functionality described herein. An example of such a protocol is, without limitation, the Link Aggregation Control Protocol (LACP).

Logic on the adjacent network device then computes a hash value based on the data packet (block 515). Generally, such a hash value is used for load balancing purposes on the adjacent network device. More specifically, the hash value is used to select one of the links in the link bundle on which to transmit the link (block 520). The adjacent network device then transmits the data packet on the selected link (block 525). For example, in the network environment 200 shown in FIG. 2, the switch 220 could represent the adjacent network device, and could select the port $225_3$ using a calculated hash value for the data packet. The switch 220 could then transmit the data packet to the switch 215, using the link between the ports $225_3$ and $240_5$.

At some later point in time, the path optimization component 150 on the adjacent network device receives an indication to transmit subsequent data packets from the particular data flow, using only a subset of the links in the link bundle (block 530). For example, the path optimization component 150 on the switch 215 could have determined, upon receiving the data packet from the adjacent network device, that the particular data flow is already being processed by a service module residing on the switch 210. Accordingly, the path optimization component 150 on the switch 215 could forward the data packet to the switch 210, using the virtual switch layer link 205. Upon receiving the data packet over the virtual switch layer link, the path optimization component 150 on the switch 210 could transmit the indication to the adjacent network device 220, indicating that the adjacent network device should forward subsequent data packets belonging to the particular data flow using only the links between the adjacent network device 220 and the switch 210. That is, in the environment 200, the switch 220 could be instructed to forward the subsequent data packets using only its ports $225_{1-2}$ (as opposed to all of the ports $225_{1-4}$ in the link bundle).

For instance, the adjacent network device could maintain a mapping of each of its ports to the corresponding physical network device of the virtual switch. As an example, assume that the adjacent network device has ports 1, 2, 3 and 4 that connect to the virtual switch. In such an example, the adjacent network device could maintain a mapping indicating that ports 1 and 2 map to a first physical network device within the virtual switch, and that ports 3 and 4 map to a second physical network device within the virtual switch. If the adjacent network device then receives the aforementioned indication from the first physical network device, logic on the adjacent network device could then determine that ports 1 and 2 map to the first physical network device (i.e., using the mapping of ports to neighboring network devices within the virtual switch), and that only ports 1 and 2 should be used for forwarding subsequent data packets that belong to the particular data flow to the virtual switch.

Upon receiving the indication, the path optimization component 150 on the adjacent network device configures routing logic on the adjacent network device for the particular data flow, such that the hash function used for load balancing purposes only produces hash values that correspond to the subset of links in the link bundle (block 535). For instance, in the network environment 200, assume that the switch 220 is configured with a hash function that produces a value between 1 and 4, where a value of 1 corresponds to the port $225_1$, a value of 2 corresponds to the port $225_2$, a value of 3 corresponds to the port $225_3$, and a value of 4 corresponds to the port $225_4$. In such an example, upon receiving the indication, the path optimization component 150 could be configured to alter the hash function to only produce hash values of 1 and 2, thereby load balancing traffic for the particular data flow only between the ports $225_1$ and $225_2$, and thus only forwarding traffic relating to the particular data flow to the switch 210.

Accordingly, the method 500 continues where the adjacent network device receives a subsequent data packet belonging to the particular data flow (block 540), and computes a hash value based on the subsequent data packet using the modified hash function (block 545). In this example, the hash value based on the subsequent data packet will pertain to one of the subset of links in the link bundle, as a result of the modified hash function. The adjacent network device then transmits the subsequent data packet using the link corresponding to the hash value (block 550), and the method 500 ends. Advantageously, the method 500 provides for more efficient paths within the virtual switch (e.g., the virtual switch made up of the switches 210 and 215, in the network environment 200), by minimizing the amount of data plane traffic flowing across the virtual switch layer link between the physical switches in the virtual switch.

Moreover, by pinning the data flow to a hash of all the links to the network device from which the indication was received, embodiments enables the forwarding functionality on the adjacent switch to operate without any functional impact. That is, adjusting the hash function on the adjacent network device may not alter the functionality of the adjacent network device, since the adjacent network may already be configured to use a hash in load balancing data packets across the bundle of links connecting the adjacent network device and the virtual network device. Additionally, the adjacent network device still retains the advantages of using a hash-based load balancing technique for forwarding data packets. Such advantages include redundancy of the links between the adjacent network device and the virtual network device, which can be particularly useful during link outages or equal-cost multi-path (ECMP) path changes.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a path optimization component 150 within the cloud could optimize paths for a virtual network device in the cloud, the virtual network device including a first physical network device and a second physical network device, connected using a virtual network device layer link. The path optimization component 150 could receive a first data packet belonging to a first data flow, at the first physical network device, from the second physical network device, over the virtual network device layer link. The path optimization component 150 could then determine an adjacent network device from which the second physical network device received the first data packet, and the path optimization component 150 could also determine one or more links connecting the first physical network device and the adjacent network device. The path optimization component 150 could transmit a network message to the adjacent network device, where the adjacent network device is configured to transmit subsequent data packets from the first data flow to the virtual network device, using only the determined one or more links, responsive to receiving the network message. Advantageously, doing so helps to ensure efficient traffic flow for virtual network devices in the data centers for the cloud.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of optimizing paths in a network environment containing a virtual network device, the virtual network device including a first physical network device and a second physical network device, connected using a virtual network device layer link, and the method comprising:
    responsive to receiving a first data packet belonging to a first data flow, at the first physical network device, from the second physical network device, over the virtual network device layer link:
        determining, by the first physical network device, an adjacent network device from which the second physical network device received the first data packet;
        determining, by the first physical network device, one or more links connecting the first physical network device and the adjacent network device; and
        transmitting a network message from the first physical network device to the adjacent network device, wherein the network message specifies the determined one or more links, and wherein, responsive to receiving the network message, the adjacent network device is configured to transmit subsequent data packets belonging to the first data flow to the virtual network device using only the determined one or more links.

2. The method of claim 1, wherein the adjacent network device is configured to, upon receiving the network message, configure a hash function on the adjacent network device to only return hash values corresponding to the one or more links, when processing the subsequent data packets from the first data flow.

3. The method of claim 1, wherein determining the adjacent network device from which the second physical network device received the first data packet, further comprises:
    determining a link on the second physical network device on which the first data packet was received; and
    identifying the adjacent network device, based on the link of the second physical network device.

4. The method of claim 1, wherein the first physical network device is configured with a service module, and wherein the service module is configured to perform a predefined operation for data flows on the first physical network device.

5. The method of claim 4, wherein the second physical network device is configured to:
    determine that the first data packet belongs to the first data flow, and
    responsive to determining that the first data flow is being processed by the service module on the first physical network device, transmit the first data packet to the first physical network device over the virtual network device layer link.

6. The method of claim 1, wherein the first physical network device and the second physical network device are joined together into the virtual network device, using one of (i) virtual switching system (VSS) protocol and (ii) virtual port channel (VPC) protocol.

7. A first physical network device in a network environment containing a virtual network device, the virtual network device including the first physical network device and a second physical network device, connected using a virtual network device layer link, comprising:
    a processor; and
    a memory containing a program that, when executed by the processor, performs an operation for optimizing paths in the network environment, the operation comprising:
        responsive to receiving a first data packet belonging to a first data flow, at the first physical network device, from the second physical network device, over the virtual network device layer link:
            determining, by the first physical network device, an adjacent network device from which the second physical network device received the first data packet;
            determining, by the first physical network device, one or more links connecting the first physical network device and the adjacent network device; and
            transmitting a network message from the first physical network device to the adjacent network device, wherein the network message specifies the determined one or more links, wherein, responsive to receiving the network message, the adjacent network device is configured to transmit subsequent data packets belonging to the first data flow to the virtual network device using only the determined one or more links.

8. The first physical network device of claim 7, wherein the adjacent network device is configured to, upon receiving the network message, configure a hash function on the adjacent network device to only return hash values corresponding to the one or more links, when processing the subsequent data packets from the first data flow.

9. The first physical network device of claim 7, wherein determining the adjacent network device from which the second physical network device received the first data packet, further comprises:
    determining a link on the second physical network device on which the first data packet was received; and
    identifying the adjacent network device, based on the link of the second physical network device.

10. The first physical network device of claim 7, wherein the network device is configured with a service module, and wherein the service module is configured to perform a predefined operation for data flows on the first physical network device.

11. The first physical network device of claim 10, wherein the second physical network device is configured to:
    determine that the first data packet belongs to the first data flow, and
    responsive to determining that the first data flow is being processed by the service module on the first physical network device, transmit the first data packet to the first physical network device over the virtual network device layer link.

12. The first physical network device of claim 7, wherein the first physical network device and the second physical network device are joined together into the virtual network device, using one of (i) virtual switching system (VSS) protocol and (ii) virtual port channel (VPC) protocol.

13. A computer program product for optimizing paths in a network environment containing a virtual network device, the virtual network device including a first physical network device and a second physical network device, connected using a virtual network device layer link, comprising:
    a non-transitory computer-readable medium that stores computer code; and
    computer code that, responsive to receiving a first data packet belonging to a first data flow, at the first physical network device, from the second physical network device, over the virtual network device layer link:
        determines, at the first physical network device, an adjacent network device from which the second physical network device received the first data packet;
        determines, at the first physical network device, one or more links connecting the first physical network device and the adjacent network device; and
        transmits a network message from the first physical network device to the adjacent network device, wherein the network message specifies the determined one or more links, wherein, responsive to receiving the network message, the adjacent network device is configured to transmit subsequent data packets belonging to the first data flow to the virtual network device using only the determined one or more links.

14. The computer program product of claim 13, wherein the adjacent network device is configured to, upon receiving the network message, configure a hash function on the adjacent network device to only return hash values corresponding to the one or more links, when processing the subsequent data packets from the first data flow.

15. The computer program product of claim 13, wherein the computer code that determines the adjacent network device from which the second physical network device received the first data packet, further comprises:
    computer code that determines a link on the second physical network device on which the first data packet was received; and
    computer code that identifies the adjacent network device, based on the link of the second physical network device.

16. The computer program product of claim 13, wherein the first physical network device is configured with a service module, wherein the service module is configured to perform a predefined operation for data flows on the first physical network device, and wherein the second physical network device is configured to:
    determine that the first data packet belongs to the first data flow, and
    responsive to determining that the first data flow is being processed by the service module on the first physical network device, transmit the first data packet to the first physical network device over the virtual network device layer link.

17. The computer program product of claim 13, wherein the first physical network device and the second physical network device are joined together into the virtual network device, using one of (i) virtual switching system (VSS) protocol and (ii) virtual port channel (VPC) protocol.

* * * * *